(12) United States Patent
Melancon

(10) Patent No.: US 8,200,074 B1
(45) Date of Patent: Jun. 12, 2012

(54) APPARATUS FOR MURKY WATER CAMERA INSPECTION OF UNDER-WATER CONSTRUCTION FEATURES

(76) Inventor: Paige Melancon, Broussard, LA (US)

(*) Notice: Subject to any disclaimer, the term of this patent is extended or adjusted under 35 U.S.C. 154(b) by 0 days.

(21) Appl. No.: 13/020,208

(22) Filed: Feb. 3, 2011

Related U.S. Application Data

(60) Provisional application No. 61/301,943, filed on Feb. 5, 2010.

(51) Int. Cl.
*G03B 17/08* (2006.01)
(52) U.S. Cl. ............... 396/28; 396/25; 396/26; 396/27; 396/29; 348/81; 114/222
(58) Field of Classification Search ............. 396/25–29; 348/81; 283/1; 114/222
See application file for complete search history.

(56) References Cited

U.S. PATENT DOCUMENTS

| | | | | |
|---|---|---|---|---|
| 3,236,167 A * | 2/1966 | Lode | | 396/25 |
| 3,750,547 A * | 8/1973 | Walthier et al. | | 396/25 |
| 3,759,605 A * | 9/1973 | Johnson | | 359/667 |
| 3,776,574 A * | 12/1973 | Henderson et al. | | 283/117 |
| 3,838,434 A * | 9/1974 | Hughes et al. | | 396/27 |
| 4,381,144 A * | 4/1983 | Breslau | | 396/27 |
| 5,089,895 A * | 2/1992 | Fraker et al. | | 348/373 |
| 5,369,455 A * | 11/1994 | Mayer | | 396/28 |
| 5,678,091 A * | 10/1997 | Daspit | | 396/28 |
| 6,752,951 B2 * | 6/2004 | Meek et al. | | 264/263 |
| 7,826,729 B2 * | 11/2010 | Cullen et al. | | 396/25 |
| 2002/0003584 A1 * | 1/2002 | Kossin | | 348/373 |

FOREIGN PATENT DOCUMENTS

GB 2420038 * 2/2004

OTHER PUBLICATIONS

Various Authors See Magazine, Underwater Photography, Publisher/Editor Peter Rowlands Jan./Feb. 2010.*

* cited by examiner

*Primary Examiner* — Clayton E Laballe
*Assistant Examiner* — Kevin Butler

(57) ABSTRACT

An underwater camera apparatus for use in obtaining photograph images of underwater structures is disclosed. The apparatus is comprised of a sealed box having a defined interior space with a transparent front face. A lens adaptor is mounted in an opening on the rear face of the box and a camera having a lens is mounted onto the lens adaptor. The box is provided with a removable cap plate allowable sealable access to the interior space of the box. The removable cap plate is used to fill the box with clear water to assist in making the apparatus buoyant neutral in an underwater environment.

14 Claims, 3 Drawing Sheets

APPARATUS FOR MURKY WATER CAMERA INSPECTION OF UNDER-WATER CONSTRUCTION FEATURES

This application claims priority to U.S. provisional application Ser. No. 61/301,943 filed Feb. 5, 2010, the entire content of which is hereby incorporated by reference.

FIELD OF THE INVENTION

The invention relates generally to the field of underwater photography and inspection and, more particularly, to an attachment for a camera to be used by divers to facilitate the inspection and documentation of features of underwater constructions.

BACKGROUND OF THE INVENTION

Divers are often used to inspect and document the integrity of the structural elements of underwater structures such as underwater bridge and structure piling or columns, pipelines, and ship hulls. The inspection and documentation would include evaluation of the visual effects of corrosion, erosion, and fatigue on such structural elements as piling, weldments, bolts, and the like. Photographs of these structural elements are often required to facilitate the inspection and documentation. Because the water is often muddy, murky, or cloudy in these underwater environments, visibility may be negligible. This lack of visibility makes the taking of photographic images, or even a clear visual inspection, of the underwater structural elements at issue difficult or impossible.

SUMMARY OF THE INVENTION

The present invention provides an improved apparatus for the inspection of the structural features of underwater structures in a muddy or murky water environment. The apparatus is intended to be utilized with an underwater camera and serves to assist in providing a clear view of the structural feature at issue to facilitate the taking of a photographic image in a muddy or murky environment.

The apparatus of the present invention is comprised of a closed box made of a clear polycarbonate polymer. It is thought that a suitable clear polycarbonate polymer for use in constructing the closed box is the polycarbonate polymer known as Lexan® manufactured by Sabic Innovative Plastics, 4600 AC Bergen op Zoom, The Netherlands. However, other clear materials such as a shatterproof glass might also be utilized. The closed box of the invention has an interior space formed by a top face, a bottom face, a front face, a rear face, and two side faces.

The rear face of the clear closed box has a lens adaptor or other means for attaching the lens of a camera to the rear face of the box. A removable cap plate is provided in one of the faces forming the box in order to provide an access opening into the interior space of the box.

The apparatus may be provided with a handle or a pair of handles to facilitate the manipulation of the box when it is under water. The apparatus may also be provided with a flash attachment connected to the camera to provide light in the muddy or murky water situations.

Prior to use of the apparatus, a camera is mounted to the rear face of the box at its lens by means of the lens adaptor. The removable cap plate on one of the faces of the apparatus, is removed and the interior space of the clear box is filled with a clear liquid such as water. The addition of the clear water into the clear box assists in making the apparatus and camera combination buoyant neutral during a dive. The removable cap plate may also be utilized to provide access to the interior of the box in order to clean or clear the box faces of fogging, condensation, mud, mold and the like that may accumulate in the interior of the box after use or over time.

To use the apparatus during the inspection and documentation of an underwater structure, a diver takes the camera and box combination on a dive into muddy or murky waters. The front face of the device is then positioned against the structural feature in which inspection or examination is desired. This positioning allows the diver to use the camera to take a photograph or image of the structural feature through the interior of the box, the clear water inside the box, and the clear polymer front face of the box. If the underwater ambient light is insufficient to obtain a satisfactory image of the structural feature being inspected, the flash attachment provided on the box may be utilized to assist in providing additional light to facilitate obtaining a satisfactory photograph or image. In the manner described herein, the structural elements or features of underwater structures such as underwater bridge and structure piling or columns, pipelines, and ship hulls may be inspected to evaluate the visual effects of corrosion, erosion, and fatigue on piling, weldments, bolts, at the like.

The box may be dimensioned as desired to accommodate the focal length of the lens and camera combination being utilized with the apparatus. It is thought that a box at least 12 inches by 12 inches by 12 inches would be sufficient.

It is thought that the box of the described apparatus will have at least a clear front face though a box provided with clear side and bottom faces, such as faces made of clear polycarbonate polymer, will assist in providing additional light for obtaining a satisfactory image. The flash attachment may be mounted internally in the interior of the box to provide light at the front face for the photograph of the desired structural feature. The device may also have a clear rear face through which the light from an externally mounted flash attachment will penetrate through the box to the clear front face.

The handles provided with the apparatus may be integrally incorporated into the side faces of the box. The box may also have a transparent removable front face cover. A box having a removable front face cover will allow the front face cover to be changed in the event that the front face cover is scratched or damaged during use.

DESCRIPTION OF THE EMBODIMENTS

In considering the drawings and the description presented herein, common features that are well established and do not bear upon points of novelty are omitted in the interest of descriptive clarity. Such omitted features may include threaded junctures, weld lines, sealing elements, gaskets, pins, fasteners, and glued or brazed junctures.

Figure 1:
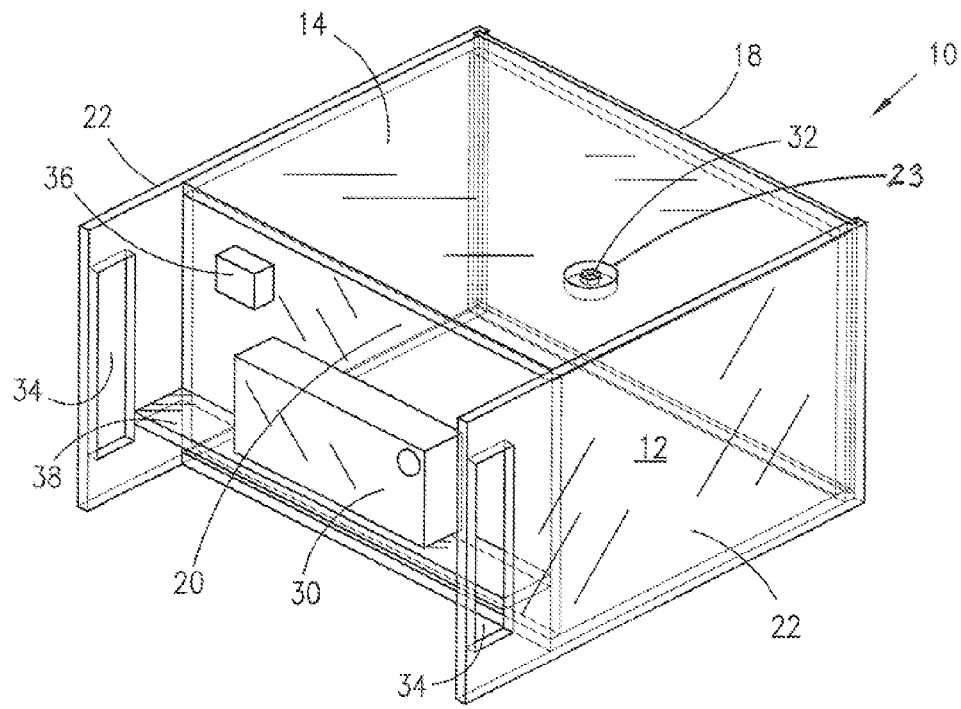
FIG. 1 is a perspective view of the apparatus of described herein.

Referring to now to the drawings and, more particularly to FIG. 1, there is shown a perspective view of the apparatus 10 of the present invention. The apparatus 10 is comprised of a closed box 12 having an interior space 25 formed by a top face 14, a bottom face 16, a front face 18, a rear face 20, and two side faces 22. It is thought that the faces 14, 16, 18, and 22 will be made of a clear, transparent, polycarbonate polymer such as the polycarbonate polymer Lexan® manufactured by Sabic Innovative Plastics, 4600 AC Bergen op Zoom, The Netherlands. However, other clear materials such as a shatterproof glass might also be utilized for the faces 14, 16, 18, and 22 of the box 12.

Figure 2:
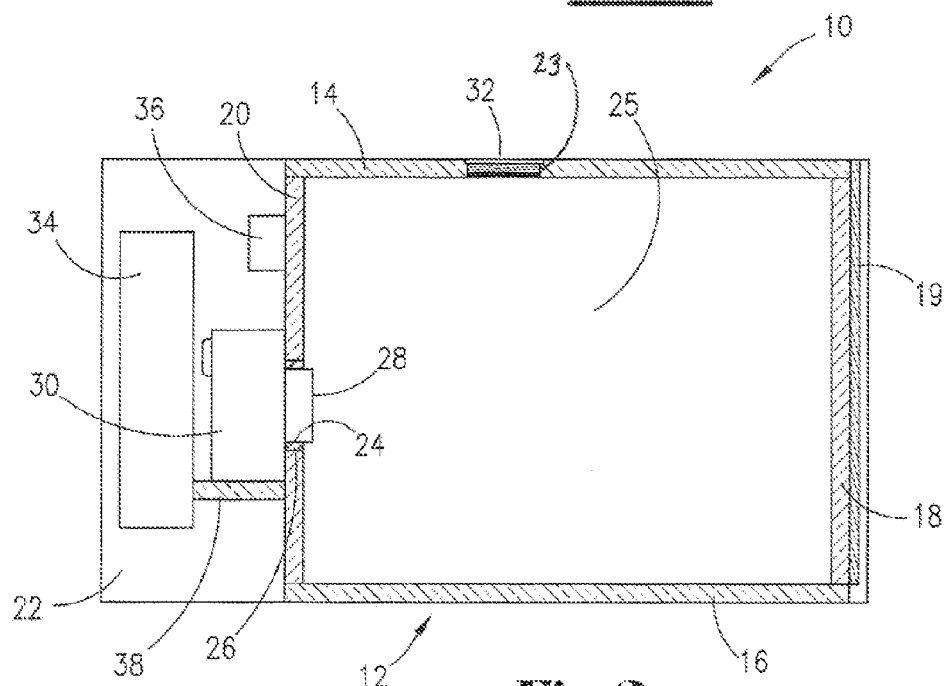
FIG. 2 is a cross-section elevation view of the apparatus shown in FIG. 1.

As shown in FIG. 2, the rear face 20 of the box 12 has an opening 24 to which is mounted a lens adaptor 26 or other suitable means for attaching the lens 28 of a camera 30 to the rear face 20 of the box 12. An opening 23 is provided in one of the faces 14, 16, 18, and 22 forming the box 12 in order to provide access to the interior space 25 of the box 12. The opening 23 into the box 12 is provided with a corresponding removable cap plate 32 that is used to seal the opening 23 as may be desired. The lens adaptor 26 and the cap plate 32 have gaskets or other sealing means not shown to assist in keeping the interior 25 of the box 12 watertight.

Figure 4:
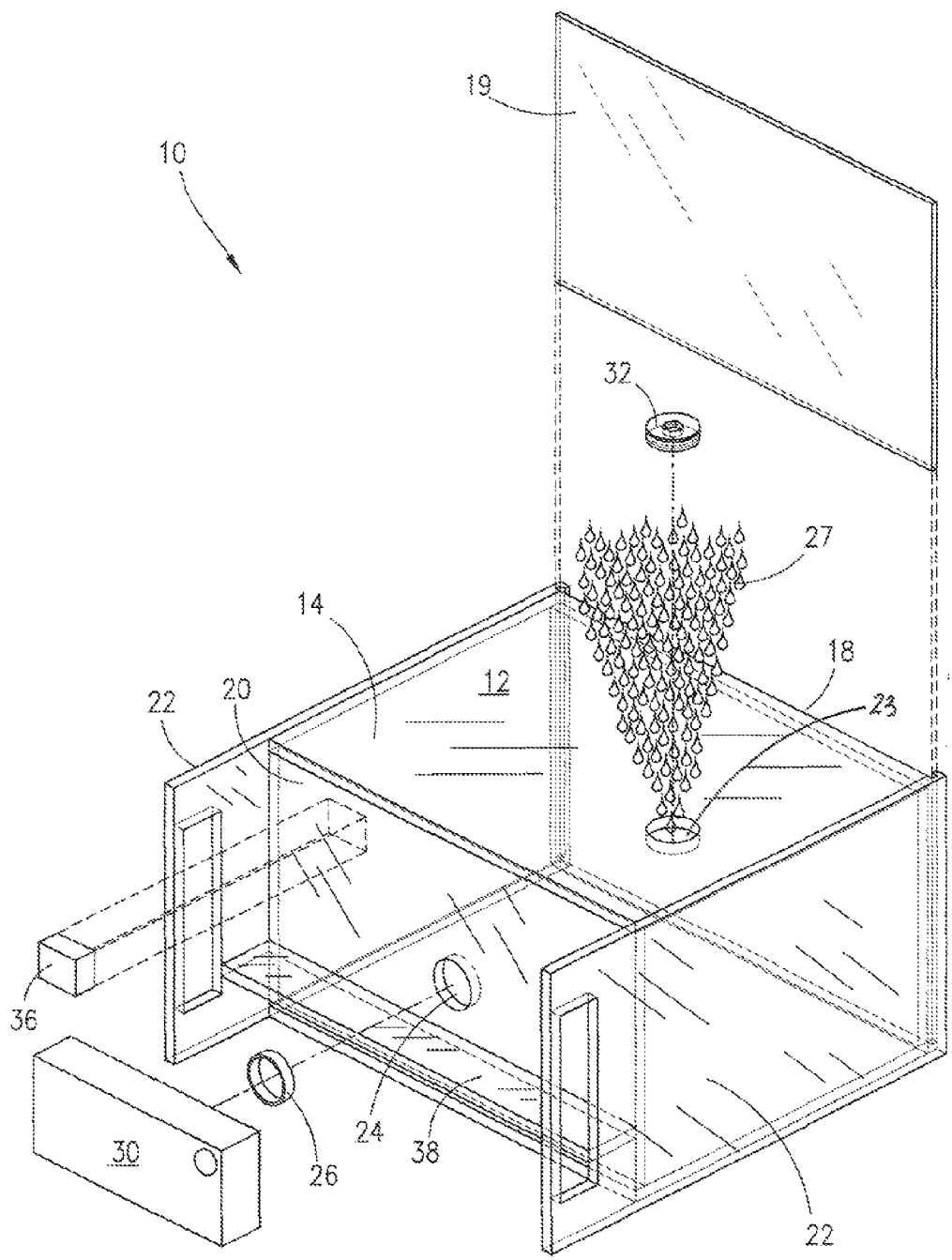
FIG. 4 is an exploded view of the apparatus shown in FIG. 1.

As shown in FIG. 2 and FIG. 4, the box 12 of the apparatus 10 may be provided with handles 34 to facilitate the manipulation of the box 12 by a diver when the box is used in an underwater environment. The apparatus 10 may also be provided with a means for providing artificial light to supplement the light in the underwater environment. Such means for means for providing artificial light may be a battery powered lamp. Such means may also be a flash attachment 36 connected to or interfaced with the camera 30 to provide additional light through the interior space 25 of the box 12 to aid in obtaining photographs when the apparatus 10 is used in muddy or murky water situations.

The box 12 may also be provided with grooves or attachments to removably retaining a transparent front face cover 19 on the box 12. The front face cover 19 may be made of any clear, transparent material such as glass but it is thought that a clear, transparent polycarbonate polymer such as the polycarbonate polymer Lexan® will be utilized. The removable front face cover 19 is positioned over the front face 18 of the box 12 and provides protection from scratches and disfigurement. The removable face cover 19 may be readily replaced if it becomes scratched or otherwise disfigured during use.

The box 12 may also be provided with a camera rest plate 38 projecting from the rear face 20 of the box 12. The camera rest plate may be used as a means for supporting the camera 30 on the box 12.

The box 12 may be dimensioned as desired to accommodate the camera 30 and the focal length of lens 28 used in the box and camera combination. It is thought that a box 12 having dimension of at least 12 inches from the front face 18 to rear face 20, at 12 inches from the top face 14 to the bottom face 16, and at least 12 inches from one side face 22 to the other side face 22 would be sufficient in most situations.

Prior to use of the apparatus 10 in an underwater environment, the camera 30 is mounted to the rear face 20 of the box 12 at its lens 28 by means of the lens adaptor 26 or by another suitable means for attaching the camera to the box 12. Any such means for attaching the camera to the box 12 is suitable though it is thought that a means for attaching the camera to the box 12 that will provide a watertight seal between the camera 30 and the box 12 will be preferred. When a camera rest plate 38 is provided the camera 30 may rest on the rest plate 30 as an additional means for supporting the camera 30 on the box 12.

The removable cap plate 32 may be removed to provide access to the interior 25 of the box 12 through the opening 23 in order to allow to allow cleaning or clearing of the box faces 14, 16, 18, and 22 of fogging, condensation, mud, mold and the like that may accumulate in the interior of the box 12 after use or over time.

Figure 3:
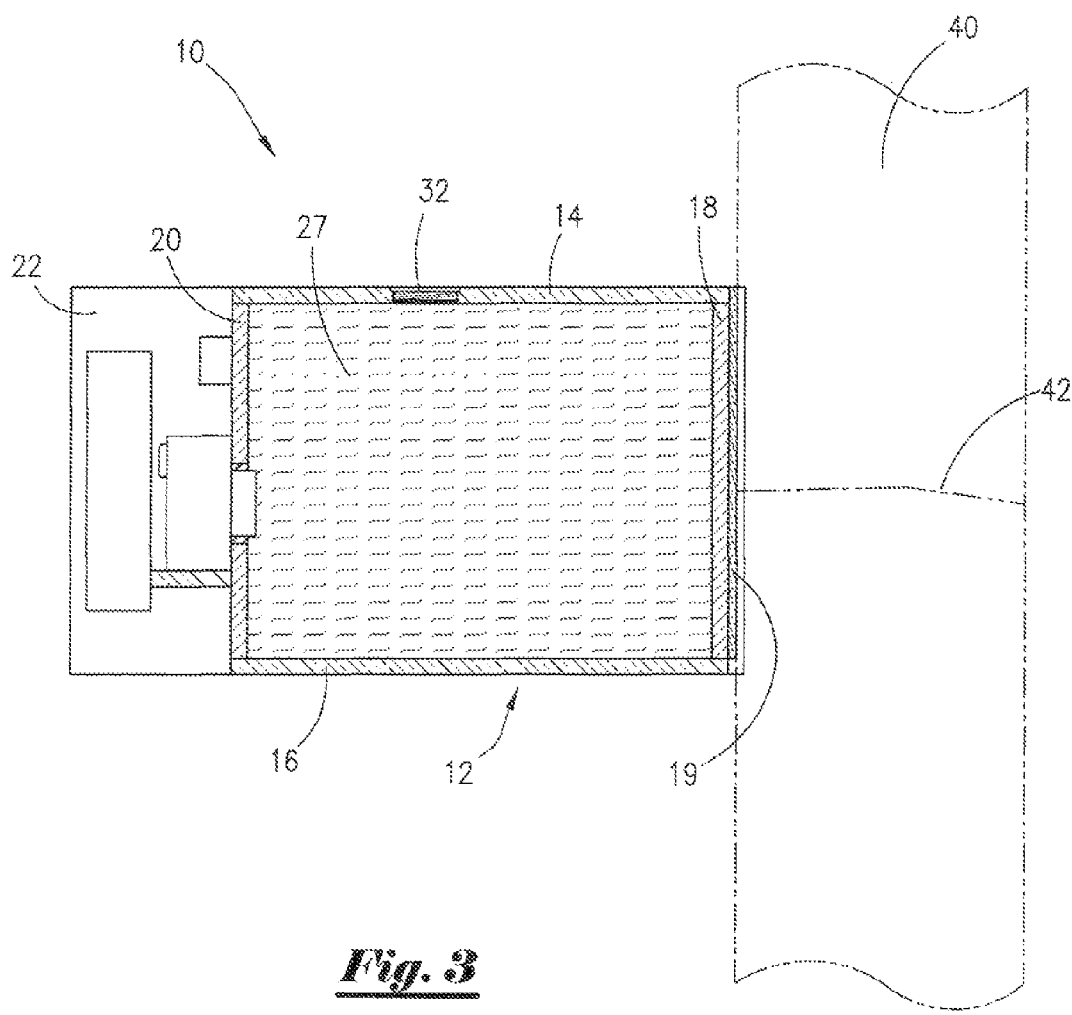
FIG. 3 is a cross-section elevation view of the apparatus shown in FIG. 1 and FIG. 2 placed in position against a desired underwater structural element for inspection and photographing of the structural element.

Referring now to FIG. 3, the removable cap plate 32 on the opening 23 of the box 12 is removed, the interior 25 of the box 12 is filled with clear water 27 or other clear liquid, and the cap plate 32 is replaced onto said opening 23. The addition of the clear water 27 to the interior 25 of the box 12 will assist in making the box 12 and camera 30 combination of the apparatus 10 buoyant neutral during a dive.

As shown in FIG. 3, the apparatus 10 is used by having a diver take the apparatus with the assembled box 12 and camera 30 combination to a desired underwater location for evaluation of a submerged structure. The diver then places the front face 18 having transparent cover 19 of the box 12 against an underwater structure shown in highlight as a column 40 in order to allow visual inspection and photographs of the desired structural feature 42. The camera 30 and flash 36 may be utilized to photograph the structural feature 42 through the clear water 27 in the interior 25 of the box 12. The clear water 27, clear face 18 and face cover 19 facilitates the photography when the structural feature 42 is submerged in murky or muddy water.

It is thought that the apparatus for and method of use presented for attachment for a camera to be used by divers to facilitate the inspection and documentation of features of underwater constructions described herein as well as its attendant advantages will be understood from the foregoing description. It is also thought that it will be apparent that various changes may be make in the form, construction and arrangement of the parts thereof without departing from the spirit and scope of the invention or sacrificing all of its material advantages, the form described herein being merely an example embodiment of the invention.

I claim:

1. An underwater camera apparatus comprising:
   (a) a sealed box having an interior space defined by a top face, a bottom face, a front face, a rear face, and two side faces, said front face of said box being comprised of transparent material;
   (b) a lens adaptor mounted in an opening on said rear face of said box;
   (c) a removable cap plate mounted onto an opening in one of said faces of said box; and
   (d) a camera having a lens mounted onto said lens adaptor.

2. The underwater camera apparatus recited in claim 1 further comprising, a clear liquid filling said interior space of said box.

3. The underwater camera apparatus recited in claim 2 further comprising, a camera rest plate projecting from said rear face of said box.

4. The underwater camera apparatus recited in claim 3 further comprising, a handle mounted on said box.

5. The underwater camera apparatus recited in claim 2 wherein said clear liquid is clear water.

6. The underwater camera apparatus recited in claim 1 wherein said top, bottom, front, rear and side faces are transparent.

7. The underwater camera apparatus recited in claim 1 wherein said top, bottom, front, rear and side faces are comprised of transparent polycarbonate polymer material.

8. The underwater camera apparatus recited in claim 4 further comprising a flash attachment interfaced with said camera.

9. An underwater camera apparatus comprising:
(a) a sealed box having an interior space defined by a top face, a bottom face, a front face, a rear face, and two side faces, said front face of said box being comprised of transparent polycarbonate polymer material;
(b) a lens adaptor mounted in an opening on said rear face of said box;
(c) a removable cap plate mounted onto an opening in one of said faces of said box;
(d) clear liquid filling said interior space of said box;
(e) a camera having a lens mounted onto said lens adaptor; and
(f) a flash attachment interfaced with said camera.

10. The underwater camera apparatus recited in claim 9 wherein said clear liquid is clear water.

11. The underwater camera apparatus recited in claim 10 wherein said front face of said box has a removable transparent front face cover.

12. The method of inspecting and documenting the visual features of an underwater structure comprising the steps of:
(a) providing a sealed box having an interior space defined by a top face, a bottom face, a front face, a rear face, and two side faces, said front face of said box being comprised of transparent material, said box having a lens adaptor mounted in an opening on said rear face of said box and a removable cap plate mounted onto an opening in one of said faces of said sealed box;
(b) providing a camera having a lens;
(c) mounting said lens of said camera onto said lens adaptor;
(e) removing said removable cap plate from said opening in said sealed box;
(f) filling said interior space of said box with a clear liquid and replacing said removable cap onto said opening in said sealed box;
(g) submerging said camera and said box combination in an underwater environment with the front of said box against a desired underwater structural feature; and
(h) using said camera to obtain a photograph of said desired structural feature.

13. The method of inspecting and documenting the visual features of an underwater structure as recited in claim 12, further comprising the additional steps of:
(a) providing means for providing artificial light to supplement the light in said underwater environment; and
(b) using said flash attachment to provide additional light to facilitate obtaining a satisfactory photograph.

14. The method of inspecting and documenting the visual features of an underwater structure as recited in claim 13 wherein said means for providing artificial light to supplement the light in said underwater environment includes providing a flash attachment interfaced with said camera.

* * * * *